United States Patent [19]

Bannai

[11] Patent Number: 4,517,643
[45] Date of Patent: May 14, 1985

[54] INTERRUPT CONTROL APPARATUS FOR A DATA PROCESSING SYSTEM

[75] Inventor: Akira Bannai, Tokyo, Japan

[73] Assignee: Tokyo Shibaura Denki Kabushiki Kaisha, Kawasaki, Japan

[21] Appl. No.: 361,372

[22] Filed: Mar. 24, 1982

[30] Foreign Application Priority Data

May 29, 1981 [JP] Japan ................. 56-80850

[51] Int. Cl.³ ............................................. G06F 9/12
[52] U.S. Cl. ............................................. 364/200
[58] Field of Search ............................. 364/200, 900

[56] References Cited

U.S. PATENT DOCUMENTS

| | | | |
|---|---|---|---|
| 3,909,797 | 9/1975 | Goss et al. | 364/200 |
| 4,037,204 | 7/1977 | Bennett et al. | 364/200 |
| 4,080,650 | 3/1978 | Beckett | 364/200 |
| 4,218,739 | 8/1980 | Negi et al. | 364/200 |
| 4,228,498 | 10/1980 | Moshier | 364/200 |
| 4,285,036 | 8/1981 | Kitagawa et al. | 364/200 |
| 4,296,470 | 10/1981 | Fairchild et al. | 364/200 |
| 4,330,822 | 5/1982 | Dodson | 364/200 |

OTHER PUBLICATIONS

DEC: Mini Computer VAX 11/780 Hardware Handbook, pp. 59–68.
880 Microcomputer System User's Manual, Sep. 1975, pp. 4-13—Section 4.

Primary Examiner—Gareth D. Shaw
Assistant Examiner—Jameson Lee
Attorney, Agent, or Firm—Oblon, Fisher, Spivak, McClelland and Maier

[57] ABSTRACT

A data processing system which include a central processing unit having a program counter, a main memory for storing a return instruction including the contents of the program counter and interrupting inhibiting information and for storing the contents of a general register in the CPU, interruption means for controlling the storage of the return instruction and the general register contents in the main memory upon occurrence of a first interruption, detection means for reading the return instruction stored in the main memory upon completion of the first interruption and for initiating the immediate occurrence of a second interruption in accordance with the inhibiting information of the return instruction read in the main memory, and return means for restoring the return instruction and the general register contents stored in the main memory to the central processing unit in the event that the detecting means determines that there is no further interruption to be accepted.

2 Claims, 8 Drawing Figures

INTERRUPT CONTROL APPARATUS FOR A DATA PROCESSING SYSTEM

BACKGROUND OF THE INVENTION

1. Field of the Invention

This invention relates to a data processing system, and more particularly to a data processing system which stores an executing program in a main memory when the system calls a subroutine or has an interruption and which upon completion of the subroutine or interruption restores the executing program which is then continued.

2. Description of the Prior Art

In the present data processing systems, a central processing unit stores in a system main memory information according to what stage the executing program is in when the program calls a subroutine or when the executing program is interrupted. The information which should be saved for some time is, for instance, an address to which the program should return as designated by a program counter, a program status word (PSW) having a condition code, and the contents of a general purpose register. Especially, in the case of a program interruption, there is much information to be saved for a period of time because the system control changes from the executing program to a subroutine program when the interruption occurs.

In general, the data processing system will not immediately accept the interruption but will inhibit the interruption for sometime. The data processing system has a flag for inhibiting the interruption, which indicates whether the interruption will be accepted or not. The flag is set and reset by instructions and is saved for a period of time as a part of the program status word (PSW) in the main memory. An instruction calls the subroutine or the interruption, and then the program status word is restored from the main memory by a return instruction.

Referring to FIG. 1 through FIG. 4, a data processing system of the prior art is shown. In FIG. 1a the format of the PSW is explained. The PSW has a program counter (PC) portion to indicate the address of the execution instruction, a condition code flag (CC) portion and an inhibit mode flag for an interruption (IHF) portion. In FIG. 1b the PSW has two bits of information for an interruption inhibit level (IHL). The data processing system using the PSW shown in FIG. 1b controls the interruptions which are assigned a priority level. If the interruption has a priority level above the priority level identified by IHL, it is accepted. Otherwise, it is refused if the priority level of the interruption is below the priority level identified by the IHL. In FIGS. 2a and 2b is shown a circuit which decides whether or not there is a request for an interruption. FIG. 2a shows a circuit for the PSW shown in FIG. 1a and FIG. 2b shows a circuit for the PSW shown in FIG. 1b. In FIG. 2a, there is formed the logical product of the interruption inhibit mode flag signal 11 from the PSW which is inverted by the inverter 13 and the interruption request signal 12 by means of the AND gate 14. For instance, if the interruption inhibit mode flag signal 11 is "0" and the interruption request signal 12 is "1", the AND gate 15 outputs a "1" accepting the interruption request. FIG. 2b shows the interruption request signals 22a, 22b, and 22c with respective priority levels 1, 2 and 3, and the interruption inhibit level outputs 21a and 21b from the PSW. A decoder 23 outputs "1" from only one of its outputs 24a–24d in response to the interruption inhibit levels 0–3. In accordance with the logical circuit as shown in FIG. 2b the output 25 signifies the existence of an interruption request to be accepted according to the following table:

TABLE

| Interruption Inhibit Level | | Interruption Request Level | | | Output |
|---|---|---|---|---|---|
| 23a | 21b | 22a | 22b | 22c | 25 |
| X | X | 0 | 0 | 0 | 0 |
| 0 | 0 | 1 | X | X | 1 |
| 0 | 0 | X | 1 | X | 1 |
| 0 | 0 | X | X | 1 | 1 |
| 0 | 1 | X | 0 | 0 | 0 |
| 0 | 1 | X | 1 | X | 1 |
| 0 | 1 | X | X | 1 | 1 |
| 1 | 0 | X | X | 0 | 0 |
| 1 | 0 | X | X | 1 | 1 |
| 1 | 1 | X | X | X | 0 |

When the program which had been interrupted returns, the CPU continues to execute the program by restoring the information which was saved during the interruption from the main memory. The CPU upon accepting an interruption usually changes its processing control to an inhibit mode in which any further interruptions are inhibited until after the accepted interruption is completed. Thus just prior to restoring the executing program, the CPU usually operates in the inhibit mode to inhibit further interruptions. In the case where a first interruption occurs, there is a great possibility that a second interruption must wait for the first interruption to be completed. The CPU releases itself from the interruption inhibiting state by restoring the PSW with the return instruction. The CPU again accepts another interruption and changes its process control to another interruption program only after it saves its present state in the main memory. Therefore, there is an inefficiency in storing again the information which was just restored.

FIG. 3 shows a flow chart for operation when an interruption occurs. The step 31 tests whether a request for an interruption may be accepted or not. Namely, the step 31 tests the level of the signal 15 or the signal 25 and determines whether the CPU is in the inhibit mode. If there is no request for an interruption, the step 32 reads the instructions designated by the program counter and performs the instruction. If there is a request for an interruption and it is not inhibited, step 35 stores information for some time in the main memory, such as the program status word (PSW) having the program counter portion and the inhibit bit for the interruption, and such as the contents of the general purpose register in the CPU. The information is stored at a location designated by the stack pointer. The stack pointer will be revised to designate the next location. This operation is called "PUSH".

FIG. 4 shows the return instruction to return to the original program from the interruption processing program. FIG. 4 only shows the step 41 corresponding to the step 35 in FIG. 3. The return instruction reverses the operation of step 35. Namely, the return instruction reads the PSW and the contents of the general purpose register from main memory as addressed by the stack pointer, and restores them into their corresponding CPU registers. The stack pointer will be revised to designate former stack location. This operation is called "POP". The operation following the end of the return instruction is the start point in FIG. 3. Therefore, if a new interruption request can be accepted by the designation of a restored PSW, the step 35 performs the PUSH operation again.

SUMMARY OF THE INVENTION

It is accordingly a principal object of this invention to provide a new and improved data processing system capable of performing an interruption at high speed.

It is another object of this invention to provide a new and improved data processing system which stores the state of an interrupted program in main memory when the system calls a subroutine or has an interruption and which quickly restores the interrupted program from main memory when the interrupted program is returned after the interruption.

It is yet another object of the invention to provide a new and improved high speed data processing system wherein a CPU efficiently saves and restores information in the event of repeated interruptions.

It is yet another object of this invention to provide a new and improved data processing system wherein a "POP" operation controlled by a stack pointer in response to the return instruction is deferred until it is determiend whether or not any further interruptions are to be accepted and until completion of such further interruptions, if any.

These and other objects are achieved according to the invention by providing a new and improved data processing system which includes a central processing unit having a program counter, a main memory for storing a PSW including the contents of the program counter and interrupting inhibiting information and for storing the contents of a general register in the CPU, interrruption means for controlling the storage of the return instruction and the general register contents in the main memory upon occurrence of a first interruption, detection means for reading the PSW stored in the main memory upon completion of said first interruption and for initiating the immediate occurrence of a second interruption in accordance with the inhibiting information of the PSW read in said main memory, and returning means for restoring the return instruction and the general register contents stored in the main memory to the central processing unit in the event that said detecting means determines that there is no further interruption to be accepted.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 3:
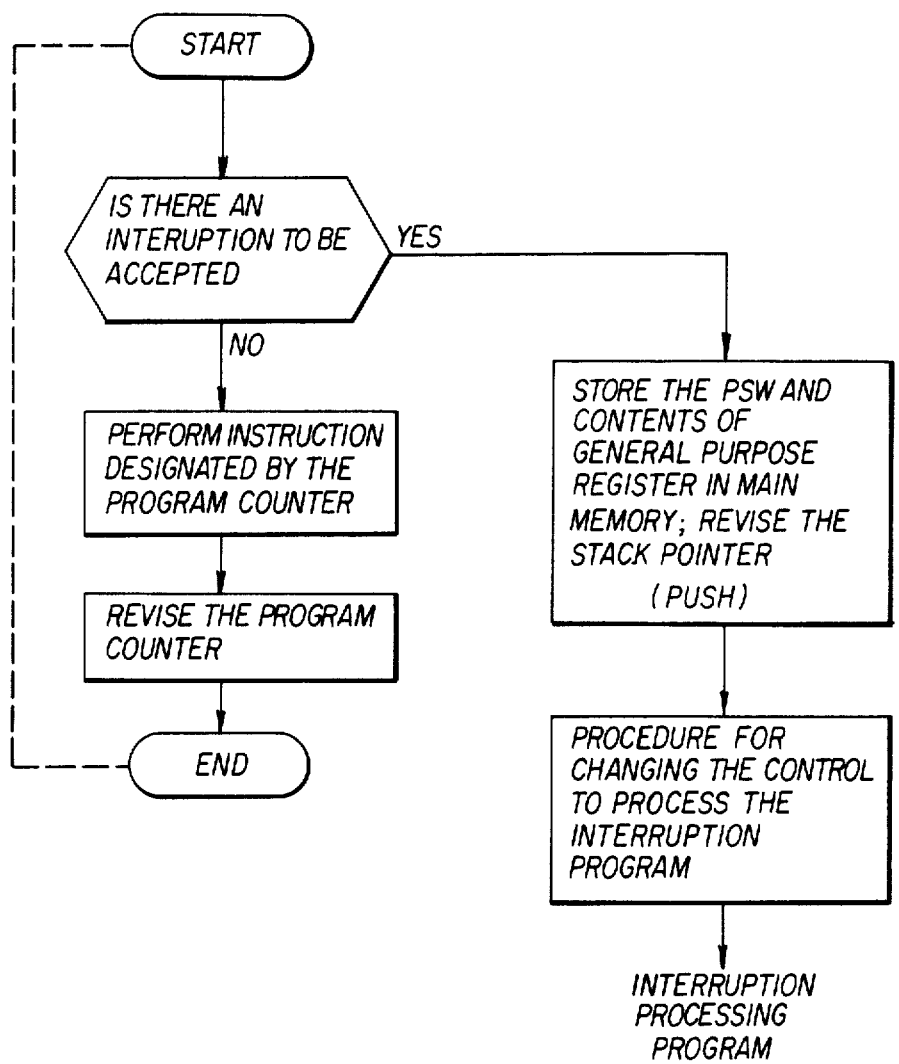
FIG. 3 is a flow chart illustrating operation of the prior art when an interruption occurs.
Figure 4:
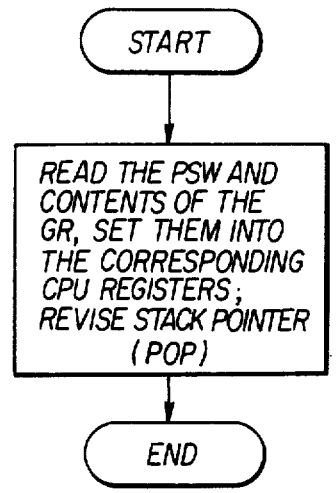
FIG. 4 is a flow chart illustrating the return operation of the prior art.
Figure 6:
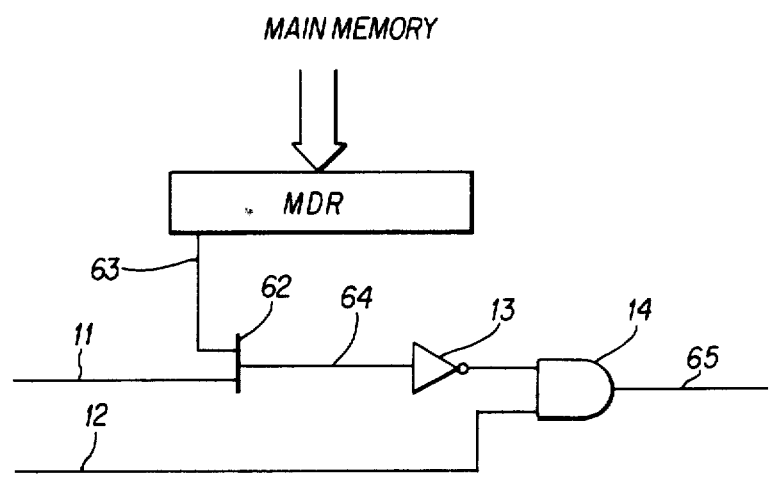
FIG. 6 is a circuit diagram of the interruption operation of the present invention.
Figure 5:
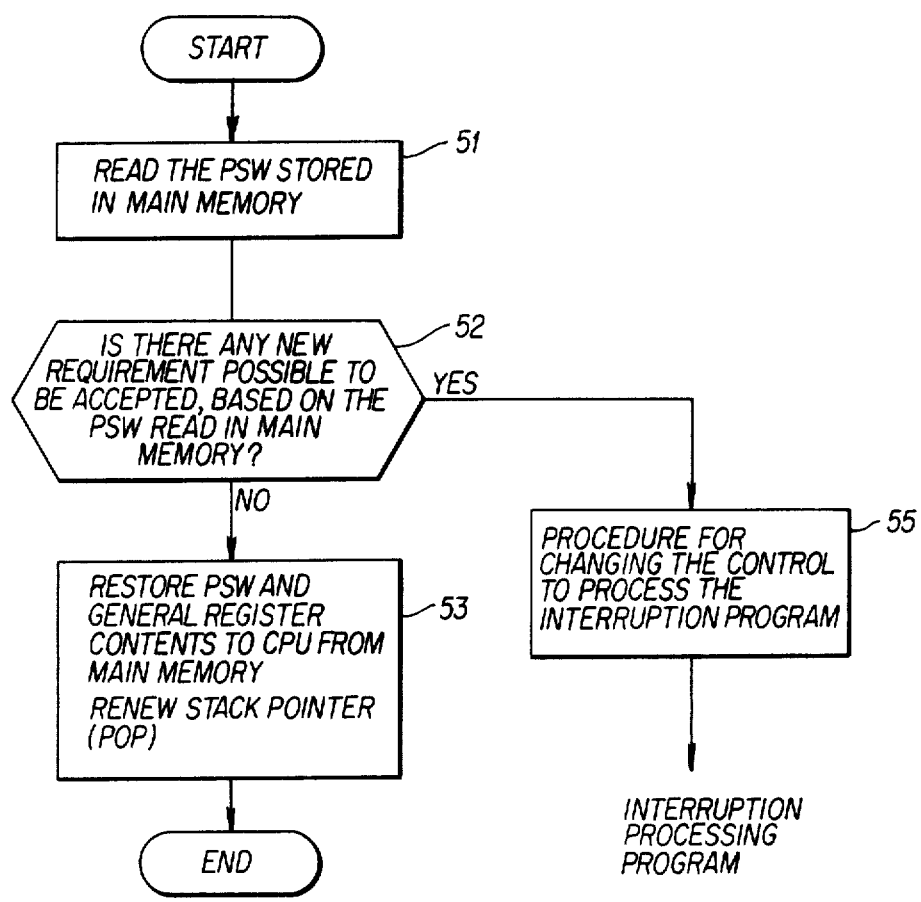
FIG. 5 is a flow chart of the interruption operation of one embodiment of the present invention.

Referring now to the drawings, wherein like reference numerals designate identical or corresponding parts throughout the several views, and more particularly to FIGS. 5 and 6 thereof, the flow chart steps 51 and 53 correspond to the step 41 in FIG. 4. The step 55 has a similar function to the step 36 in FIG. 3. At the beginning of the return instruction, the step 51 reads the PSW stored in the main memory as addressed by the stack pointer. Step 52 tests whether a new interruption request can be accepted based on the inhibit information read from the PSW stored in main memory. If an interruption request can be accepted, the step 52 proceeds to the step 55 which corresponds to the step 36 shown in FIG. 3, and proceeds to change the process control to the interruption control. In this case, the step corresponding to the step 35 in FIG. 3 can be deleted.

There are several methods for the performing test at the step 52. In one method the step 52 reads the interruption inhibit information portion of the PSW information from the main memory and restores it in the register of the CPU and performs the logical operations indicated in FIGS. 2a and 2b. In this method, however, the PSW is not removed from the main memory, nor are the contents of the CPU general register, which fact avoid the necessity of a "PUSH" step in the event that a further interruption is required.

Figure 1A:
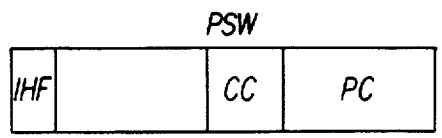
FIG. 1a and FIG. 1b are examples illustrating the format of a program status word.
Figure 1B:
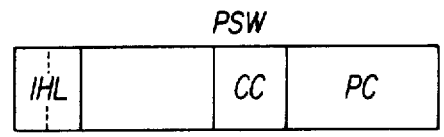
Figure 2A:
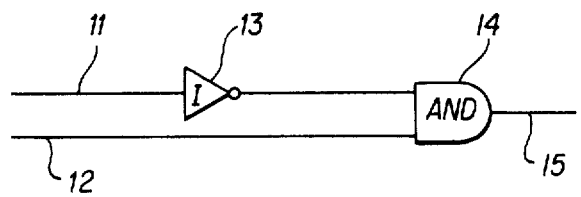
FIGS. 2a and 2b are circuit diagrams for detecting an interruption request.
Figure 2B:
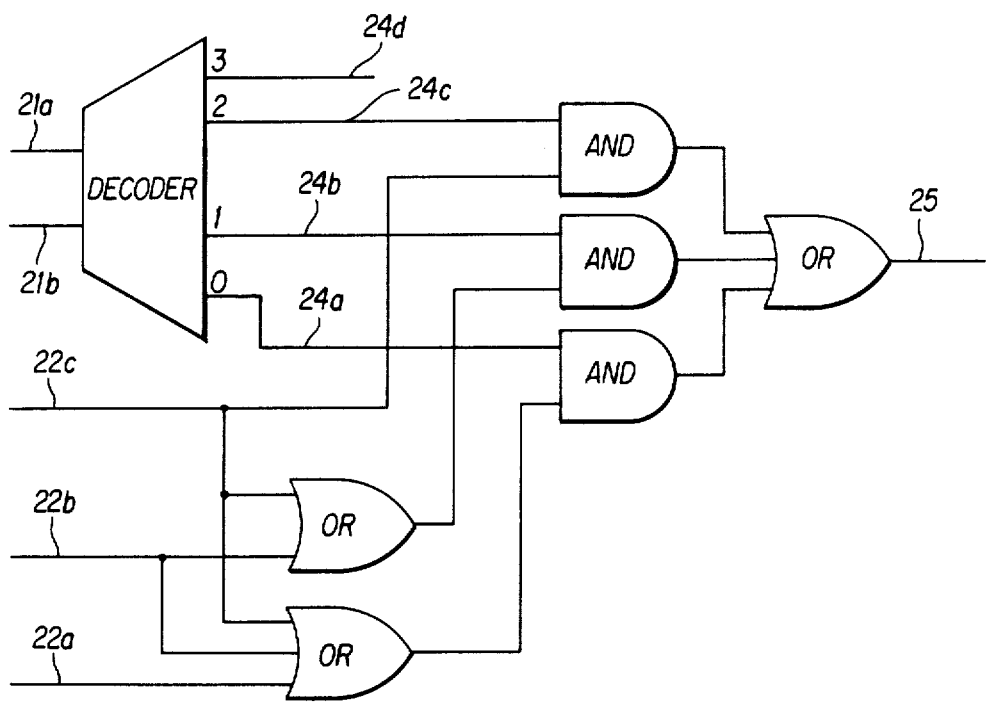

In another method, the step 52 tests whether there is a new interruption request which can be accepted by directly reading the interruption inhibit information from main memory where it was stored before restoring the PSW information to the CPU. As schematically shown in FIG. 6, a memory data register (MDR) 61 instantaneously stores the PSW data read from the memory. A signal line 63 identifies the bit position of the data corresponding to the interruption inhibit mode flag. The output 11 represents the interruption inhibit mode flag of the PSW prior to storing in the main memory as also shown in FIG. 2a. A selector 62 (a conventional 2:1 multiplexer) functions to output the signal 63 or the signal 11. The selector 62 usually selects the signal 11, but selects the signal 63 in the event of the step 52. For example microprograms control this operation to select the signal 63 at the step 52. The elements designated by 12, 13, and 14 are the same as shown in FIG. 2a. It is possible to determine whether there is a new interruption request which may be accepted by testing the output 65 of the original PSW informations before it is restored to the CPU. The microprogram can operate the step 52 to consider the condition of the output 65. In the above explanation the return instruction to restore the original program may be by special instruction or by the usual instruction which is used to return from the subroutine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A data processing apparatus, comprising:
 a central processing unit having a program counter and a general register;

main memory means electrically connected to said CPU for storing data including a Program Status Word which includes the contents to said program counter and interruption inhibition information and wherein said main memory means stores the contents of said general register;

interruption means for controlling the storage of said data in said main memory when said CPU is processing a main program at the same time a first interruption occurs including a means for conducting a PUSH operation including the storing of the Program Status Word in said main memory;

means for processing a program associated with said first interruption;

means for saving, in an auxiliary memory, said Program Status Word, from said main memory including interruption inhibition information and the contents of said program counter at the time of said first interruption;

means for detecting an enabling second interruption including means for indicating that a second interruption has been made during the processing of said first interruption program and means for determining that the interruption inhibition information in the Program Status Word stored in said auxiliary memory indicates that said second interruption signal is enabling, while the CPU control is returning to said main program due to the execution of a return instruction after the processing of said first interruption program wherein said means for detecting outputs a detection signal when said second interruption signal has been made and when said second interruption signal has been made and is enabling;

means for conducting a POP operation during the execution of a return instruction including means for restoring the Program Status Word to the CPU from said auxiliary memory; and control means responsive to said detection signal for inhibiting the operation of said means for conducting a POP operation and for making the CPU control advance to process a program associated with said second interruption.

2. A data processing apparatus according to claim 1, further comprising:

interruption means for producing one of said first and second interruption including a priority control for establishing priority interruption levels; and wherein said interruption inhibiting information defines a priority interruption level necessary to produce an interruption and wherein said means for determining that the interruption inhibiting information in the program status word indicates the enabling of said second interruption includes a comparing means for determining whether the interruption level defined by said priority control of said interruption means has priority relative to said designating information of said interrupt inhibiting information in order to determine whether one of said first and said second interruptions is to be performed or said data is to be restored to said CPU.

* * * * *